TRAVELING-WHILE-SPRINKLING IRRIGATION APPARATUS AND SYSTEM

Original Filed Feb. 10, 1965 6 Sheets-Sheet 1

ROBERT R. STAFFORD
INVENTOR.
BY
BUCKHORN, BLORE, KLARQUIST & SPARKMAN
ATTORNEYS

TRAVELING-WHILE-SPRINKLING IRRIGATION APPARATUS AND SYSTEM

Original Filed Feb. 10, 1965 6 Sheets-Sheet 2

ROBERT R. STAFFORD
INVENTOR.
BY
BUCKHORN, BLORE, KLARQUIST & SPARKMAN
ATTORNEYS

TRAVELING-WHILE-SPRINKLING IRRIGATION APPARATUS AND SYSTEM
Original Filed Feb. 10, 1965 6 Sheets-Sheet 3
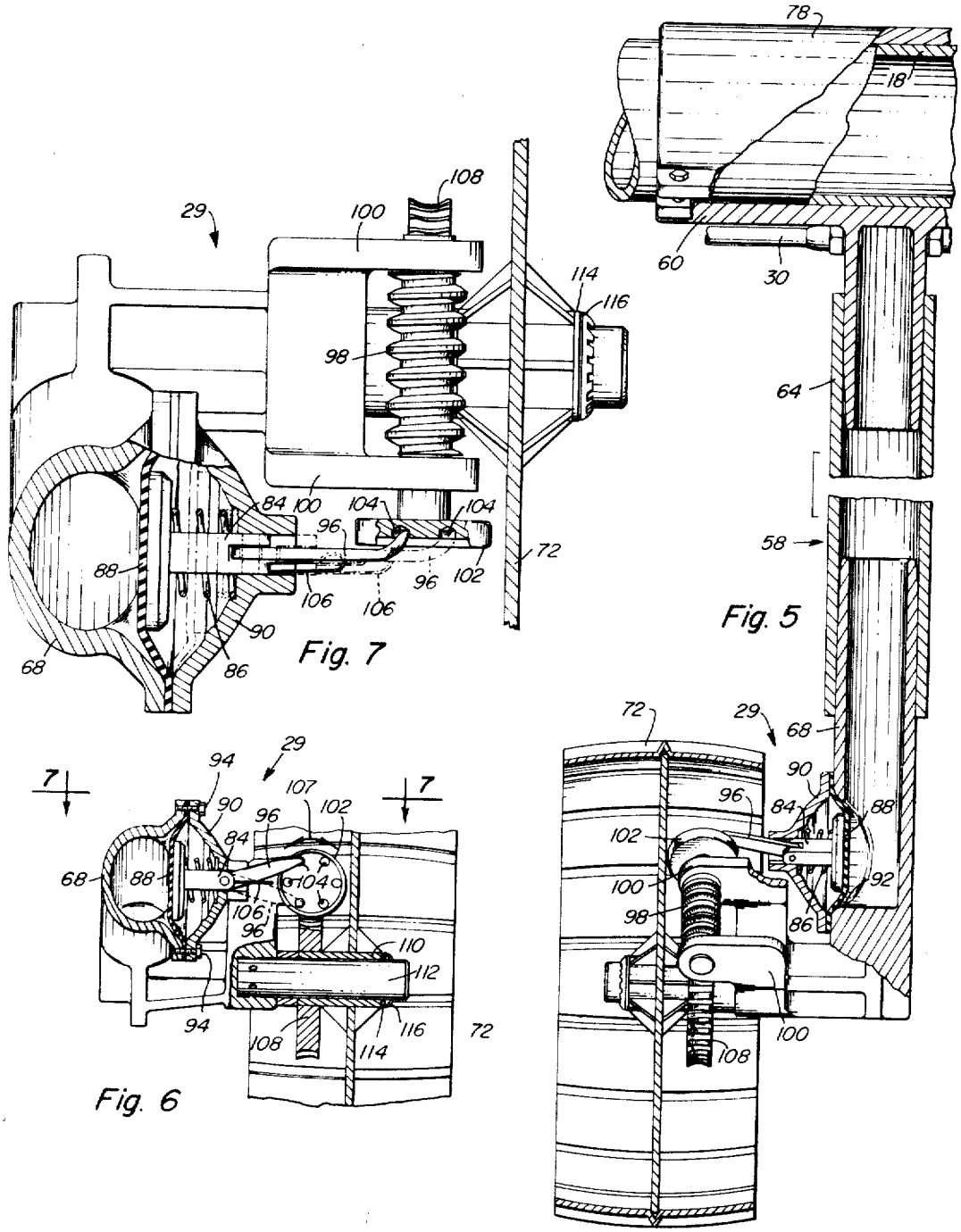
ROBERT R. STAFFORD
INVENTOR.
BY
BUCKHORN, BLORE, KLARQUIST & SPARKMAN
ATTORNEYS TRAVELING-WHILE-SPRINKLING IRRIGATION APPARATUS AND SYSTEM
Original Filed Feb. 10, 1965 6 Sheets-Sheet 4
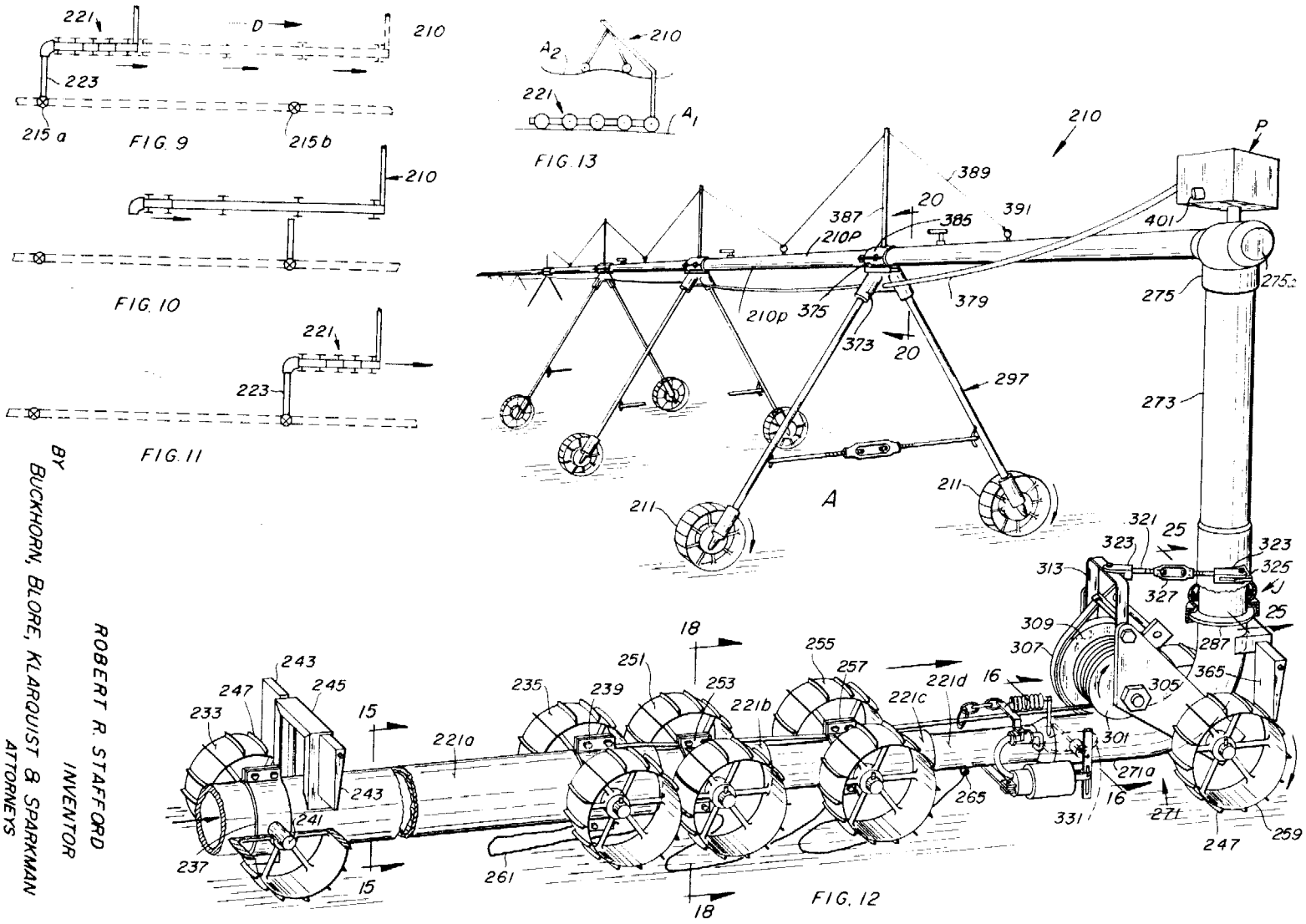
ROBERT R. STAFFORD
INVENTOR
BY
BUCKHORN, BLORE, KLARQUIST & SPARKMAN
ATTORNEYS TRAVELING-WHILE-SPRINKLING IRRIGATION APPARATUS AND SYSTEM
Original Filed Feb. 10, 1965 6 Sheets-Sheet 5
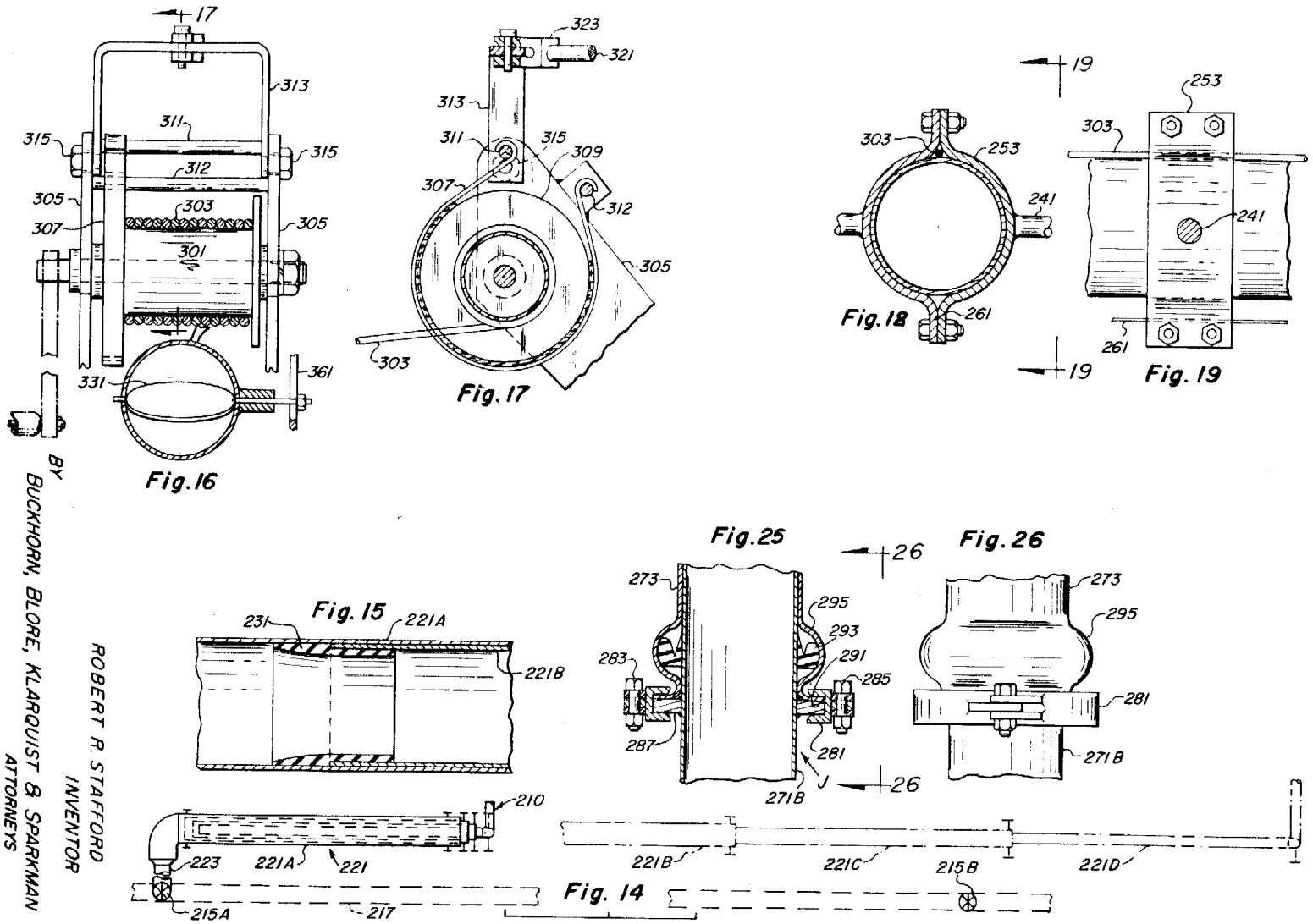
ROBERT R. STAFFORD
INVENTOR
BY BUCKHORN, BLORE, KLARQUIST & SPARKMAN
ATTORNEYS TRAVELING-WHILE-SPRINKLING IRRIGATION APPARATUS AND SYSTEM
Original Filed Feb. 10, 1965 6 Sheets-Sheet 6
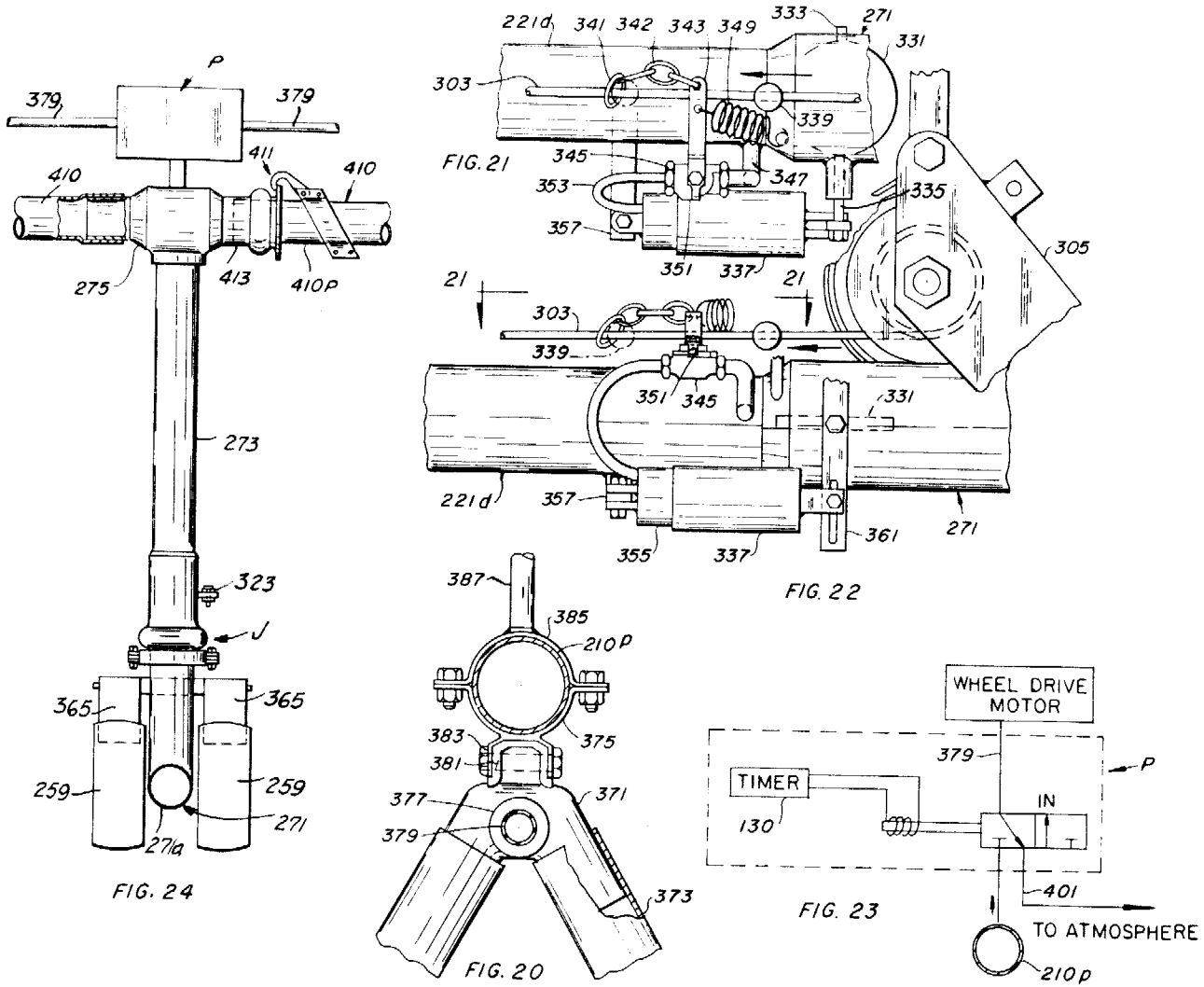
ROBERT R. STAFFORD
INVENTOR
BY
BUCKHORN, BLORE, KLARQUIST & SPARKMAN
ATTORNEYS United States Patent Office Re. 26,285

Reissued Oct. 17, 1967

26,285

TRAVELING-WHILE-SPRINKLING IRRIGATION APPARATUS AND SYSTEM

Robert R. Stafford, Rte. 4, Box 177D,
Eugene, Oreg. 97401

Original No. 3,255,968, dated June 14, 1966, Ser. No. 438,152, Feb. 10, 1965. Application for reissue Dec. 7, 1966, Ser. No. 604,522

27 Claims. (Cl. 239—212)

Matter enclosed in heavy brackets [ ] appears in the original patent but forms no part of this reissue specification; matter printed in italics indicates the additions made by reissue.

This application is a continuation-in-part of my earlier filed application entitled "Apparatus For Moving An Elongated Structure," Serial No. 268,371, filed March 27, 1963, now abandoned.

This invention relates to irrigation apparatus and systems for irrigating cultivated or uncultivated land areas. The primary form of the invention relates to irrigation apparatus to be supplied with water under pressure from a linear series of regularly spaced stationary water outlets.

While it has been heretofore proposed to provide a traveling-while-sprinkling apparatus and system, to my knowledge none of such systems have proved out in practice.

It is a main object of the present invention to provide a workable and practical traveling-while-sprinkling irrigation apparatus which is capable of irrigating a land area while traveling thereover; and more particularly to provide such an irrigation apparatus designed to continuously and uninterruptedly receive water from a stationary water outlet during travel of the apparatus from a position near one outlet to a position near a succeeding or second outlet.

It is another object of the invention to provide an irrigation apparatus having a sprinkler pipeline supported for movement in a direction at right angles to its length and having wheel means distributed longitudinally of the pipeline and driven in a novel manner by pulsating water pressure so that the various sections of the sprinkler pipeline advance in unison over a land area.

A further object of the invention is to provide an irrigation apparatus having a self-driven sprinkler pipeline means driven over a land area in a direction at right angles to its length, there being a self-driven movable water supply mechanism connected to the pipeline means, and wherein the movement of the latter supply mechanism is regulated or controlled so that its rate of movement is equal to the effective rate of the sprinkler pipeline means.

A further object of the invention is to provide irrigation means by which certain existing irrigation systems can be converted to an irrigation apparatus or system of the present invention, with a saving of a substantial portion of the existing equipment, and thus a saving of the investment the owner may already have in his existing irrigation apparatus or system.

Various other objects of the invention will be apparent from the following description taken in connection with the accompanying drawings wherein:

FIG. 5 is a view taken along the line 5—5 of FIG. 3, on an enlarged scale and with parts broken away for clarity;

FIG. 6 is a partial section view taken along the line 6—6 of FIG. 3 showing the details of a drive motor;

FIG. 7 is a view taken along the line 7—7 of FIG. 6 with parts broken away for clarity;

FIGS. 9, 10 and 11 are diagrammatic views showing in successive stages the advancement of an irrigation apparatus of the present invention over a land area and its connection and disconnection from stationary water outlets, the disclosure in FIGS. 9, 10 and 11 not being to scale because of the impracticability of doing so in a drawing of this size;

FIG. 12 is a perspective view of a later developed form of my irrigation apparatus;

FIG. 13 is a diagrammatic view illustrating a problem cured by my apparatus;

FIG. 14 is a somewhat diagrammatic view of the telescopic assembly of my irrigation apparatus showing the same in full lines in its contracted position, and in broken lines in its extended condition, FIG. 14 being more nearly to scale than the disclosure in FIGS. 9 through 11;

FIG. 15 is a fragmentary vertical section taken in the direction of the arrows 15—15 of FIG. 12;

FIG. 16 is a fragmentary vertical section taken in the direction of the arrows 16—16 of FIG. 12;

FIG. 17 is a vertical section taken along line 17—17 of FIG. 16;

FIG. 18 is a fragmentary vertical section taken along line 18—18 of FIG. 12;

FIG. 19 is a fragmentary elevational view taken in the direction of the arrows 19—19 of FIG. 18;

FIG. 20 is a fragmentary vertical sectional view taken along line 20—20 of FIG. 12;

FIG. 21 is a fragmentary plan view showing the valve control structure of FIG. 12, and being taken generally in the direction of the arrows 21—21 of FIG. 22;

FIG. 22 is a side elevational view of the structure shown in FIG. 21;

FIG. 23 is a schematic diagram of a form of common wheel power source which is employed with the apparatus in FIG. 12;

FIG. 24 is a view in elevation taken across the water supply assembly of a modified form of the invention and showing the supply of water in opposite directions through sprinkler pipelines;

FIG. 25 is a fragmentary vertical sectional view taken along line 25—25 of FIG. 12; and FIG. 26 is a fragmentary elevational view taken in the direction of arrows 26—26 of FIG. 25.

Figures 1, 2, 8:
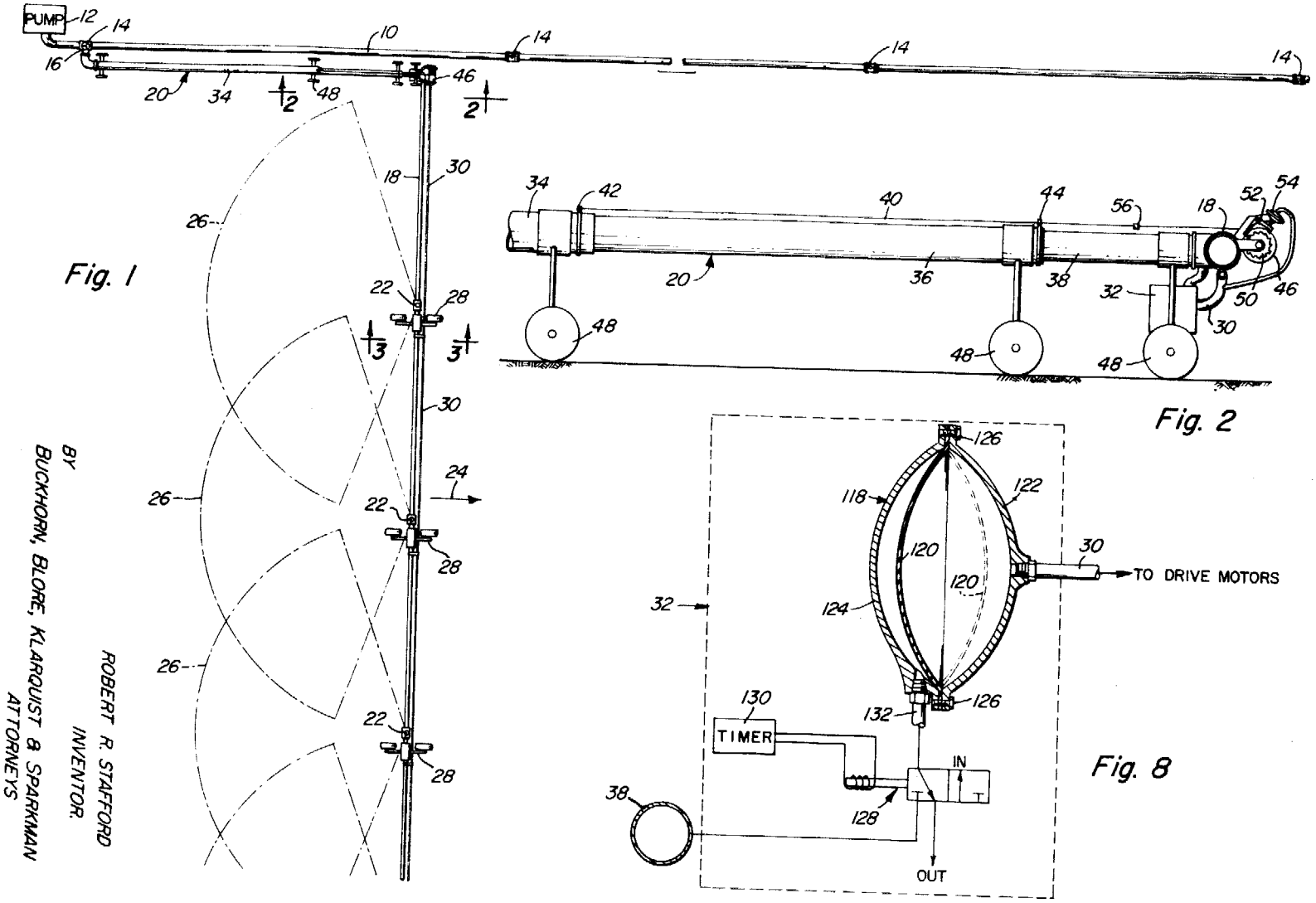
FIG. 1 is a partially diagrammatic, plan view of one embodiment of the irrigation apparatus of the present invention.
FIG. 2 is a side view of a portion of the telescopic connector employed in the present invention, taken along the line 2—2 of FIG. 1 and being on an enlarged scale.
FIG. 8 is a schematic diagram of one embodiment of the common power source employed in the apparatus [to] *of* FIGS. 1 to 7.

FIGS. 1 through 8 show a form of the invention conceived by me prior to the form of the invention disclosed in FIGS. 12–23 and 25 and 26, and the FIG. 1 form of the invention will be first described. This form of the invention includes a main conduit 10 having one end connected to a water pump 12 or other source of irrigation fluid. A plurality of side outlets 14 are spaced longitudinally along such main conduit. Each of these outlets is normally closed by a valve plate which is opened by a valve stem on a branch conduit stub 16 which is releasably attached to the main conduit 10 in the manner shown in my U.S. Patent No. 3,164,360, granted January 5, 1965, entitled Fluid Conduit and Branch Outlet Construction. The branch stub 16 is connected to a distribution pipe 18 forming part of an irrigation line, by a telescopic connector 20 which enables movement of such distribution pipe along the main conduit while extending substantially perpendicular to such main conduit. A plurality of sprinkler devices 22 are connected to the interior of the distribution pipe 18 at positions longitudinally spaced along such pipe. Each of the sprinkler devices 22 is adjusted so that it sprays water or other irigation fluid through an angle less than 180°, for example 140°, over an area 26 in a direction behind the pipe as it is moving along the main conduit 10 in the direction of arrow 24. The individual areas of coverage 26 of adjacent sprinkler devices 22 overlap so that the entire surface of the ground over which the distribution pipe 18 travels is irrigated by the sprinkler devices.

The distribution pipe 18 is held a fixed distance above the ground by a plurality of support carriages 28 which are attached to such distribution pipe at positions spaced longitudinally along such pipe. Each of the support carriages 28 is provided with at least one drive motor 29 for moving such carriage as shown in FIGS. 3 to 7. Each of these drive motors is connected to a common coupling device including a coupling pipe 30 which forms part of a closed fluid system for transmitting power from a common power source 32 to such drive motors. The power source is supported on the end of the telescopic connector 20 as shown in FIG. 2.

The telescopic connector 20 as shown in the drawings includes three pipe sections 34, 36 and 38, which in a typical irrigation structure would have diameters of six inches, five inches and four inches, respectively, and are so mounted that connector pipe 38 slides within connector pipe 36 and both of these pipes slide within the largest pipe 34 which is fixedly connected to the branch stub 16. Each of these connector pipes is preferably of substantially equal length, for example, thirty feet so that the maximum amount of movement of the distribution pipe 18 along the main conduit 10 is approximately sixty feet for connection to one of the outlet openings 14. However, the fixed connector pipe 34 adds an additional 30 feet to the distance that the distribution pipe 18 moves from the branch stub 16. Thus, the outlets 14 are spaced apart by 60 feet, the distribution pipe will be located 30 feet past the next outlet opening when the telescopic connector is fully extended so that the branch stub can be disconnected from the first outlet and the telescope connector pulled in toward such distribution pipe to a retracted position where the branch stub is reconnected to the main conduit at the next outlet. The above procedure is repeated to enable the distribution pipe 18 to be moved along the entire length of the main conduit 10 in order to irrigate a large area of land.

A guide wire 40 is attached to the rear end of the connector pipe 34 by a suitable fastener 42 and extends through an eyelet member 44 attached to the [read] *rear* end of connector pipe 36 to a drum 46 which is rotatably mounted on the rear end of the connector pipe 38. Each of the connector pipes 34, 36 and 38 are supported on a pair of wheels 48 for movement over the ground. This movement is controlled by a ratchet wheel 50 attached to the axis of the drum 46 and a double acting pawl 52 whose opposite ends alternately engage one of the teeth of such ratchet wheel to allow the wire 40 to be unwound from the drum 46 in short sections. Of course, the force for moving the connector pipes 36 and 38 away from the fixed connector pipe 34 to their extended position is furnished by the fluid pressure within the telescopic connector 20 which is equal to the fluid pressure within the main conduit 10 and may be on the order of 400 pounds per square inch. The rocking movement of the pawl 52 is controlled by a hydraulically actuated plunger device 54 which is connected to the coupling pipe 30 so that it is operated by the common power source 32 in synchronism with the drive motors in the manner hereafter described. It should be noted that a stop member 56 is attached to the wire 40 for engagement with the eyelet member 44 on connector pipe 36 in order to limit the maximum extension of such connector pipe. Also a crank (not shown) may be fitted or provided on the shaft of the drum 46 to wind the wire 40 about the drum so that the connector pipes 34 and 36 are reeled in over connector pipe 38 toward the drum after the branch stub has been disconnected from the main conduit.

Figure 3:
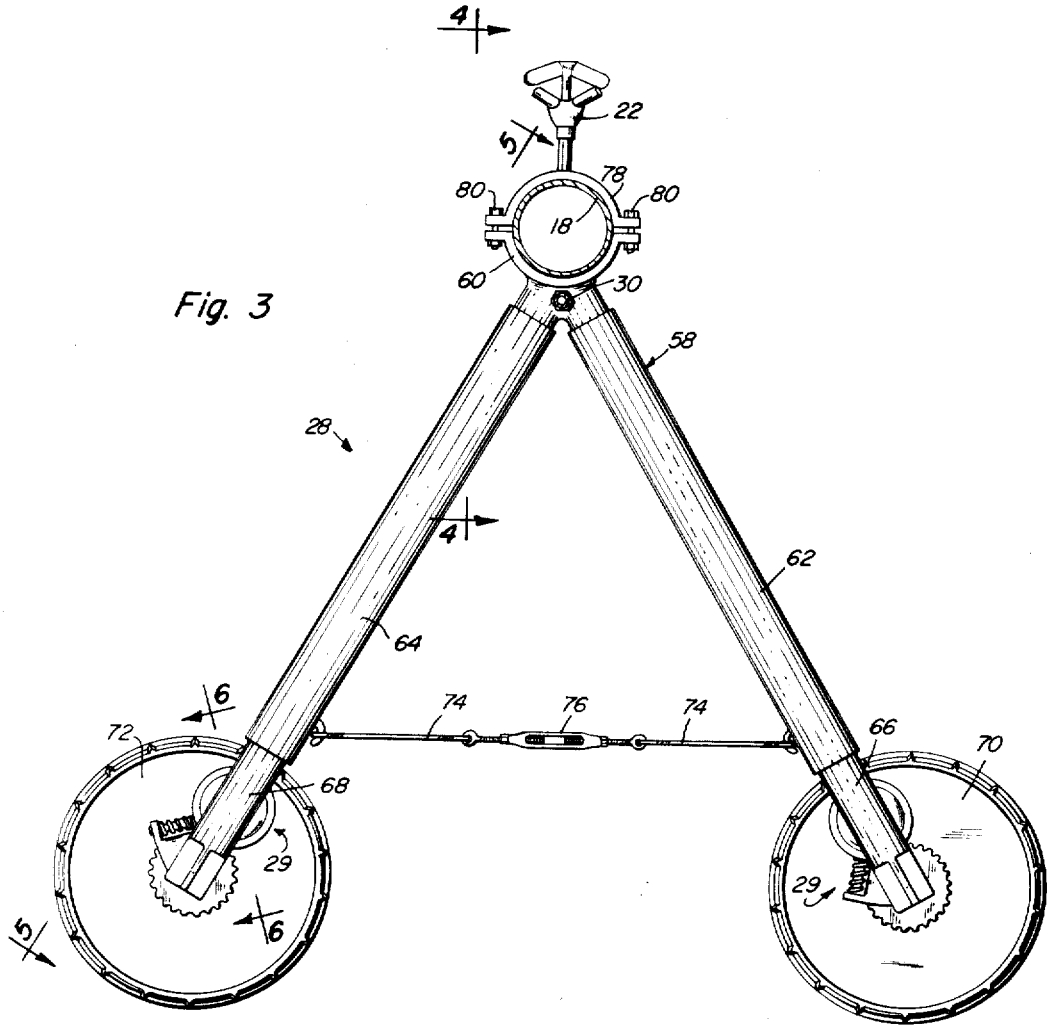
FIG. 3 is a view taken along the line 3—3 of FIG. 1, on an enlarged scale, showing a support carriage and drive motors for such support carriage.
Figure 4:
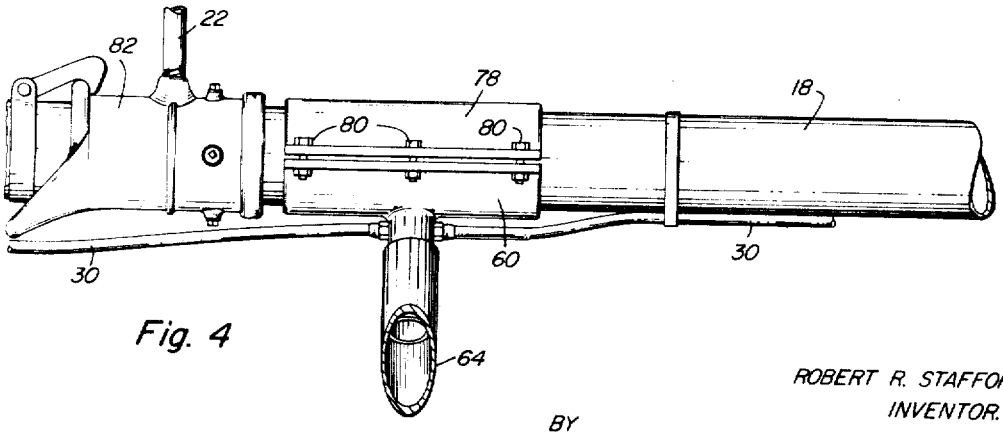
FIG. 4 is a view taken along the line 4—4 of FIG. 3.

The support carriages 28, as shown in FIG. 3, each have a V-shaped frame 58 including a saddle member 60 shaped to conform to the outer surface of the distribution pipe 18, and a pair of similar, hollow, cylindrical legs 62 and 64 which are each suitably attached at one end to a pair of tubular projections on such saddle member. The other ends of the frame legs 62 and 64 are attached to tubular extensions 66 and 68, respectively, which are pivotally attached to wheels 70 and 72, respectively, positioned on opposite sides of the distribution pipe 18. This enables the height of the frame 58 to be changed merely by substituting different length leg members 62 and 64. Frame legs 62 and 64 form an acute angle and are prevented from spreading further apart by means of a support wire 74 which may be formed in two sections each attached to one of such legs and connected together by means of a turn-buckle 76 employed to tighten such wire. As shown in FIGS. 3 and 4, the carriage 28 is attached to the distribution pipe 18 by means of a clamp member 78 which is secured to the saddle member 60 by a plurality of bolts 80 in order to clamp the distribution pipe between such saddle member and such clamp member. Also, the distribution pipe 18 is formed of a plurality of sections permanently welded together or releasably secured by conventional pipe couplings 82, as shown in FIG. 4, and the sprinkler devices 22 are attached to such pipe couplings in fluid communication with the interior of the distribution pipe.

In the construction shown, there is a drive motor 29 provided on the lower end portion of each of the leg extensions 66 and 68 in order to drive the wheels 70 and 72. The coupling pipe 30 is connected to the interior of the junction of the tubular projections of the saddle 60 so that the hollow frame 58 of the carriage 28 functions as part of the closed fluid system which transmits power to the drive motors 29 in a manner hereafter described. As shown in FIGS. 5, 6 and 7, the drive motor 29 includes a piston or plunger member 84 which is resiliently urged by a coil spring 86 into contact with a flexible diaphragm 88 of rubber or other resilient material which in conjunction with leg extension 68 forms a fluid tight chamber. The diaphragm 88 is clamped by a piston housing 90 to the leg extension 68 in order to form a fluid tight seal around an aperture or passageway 92 in such leg extension by means of bolts 94. Since the hollow carriage frames 58 and coupling pipe 30 are filled with water, oil, or other fluid, the diaphragm 88 moves into and out of the leg extension 68 in accordance with the fluid pressure of the closed fluid system formed by the coupling pipe and such carriage frame. This causes the piston 84 to move back and forth in a reciprocating manner within the piston housing 90. A dog member 96 is pivotally attached to the end of the piston rod of piston 84 so that such dog moves with the piston back and forth through an aperture in the piston housing 90 which is provided with a slot to also allow pivotal movement of the dog between the forward and reverse positions shown in FIG. 6 in a manner hereafter described.

A worm member 98 is rotatably mounted at its opposite ends on a pair of bracket arms 100 which may be cast as integral parts of the leg extension 68 or may be rigidly secured thereto by welding or in another manner. The worm 98 is provided with an enlarged circular disc portion 102 on one end thereof which is provided with a plurality of notches 104 on the outer side of such disc. Notches 104 are equally spaced about the periphery of the disc 102 and are each of a proper size to accommodate the curved point of the dog member 96. The dog 96 is resiliently urged into contact with the surface of disc 102 by a leaf spring 106 in the general U-shape of a hairpin. The ends of the leaf spring 106 are attached to the end of the piston rod 84 so that it extends substantially coaxially with respect to such piston rod and is provided with an enlarged curved middle portion which engages the side of the dog 96.

The dog 96 may be set on either side of the spring 106 in one of the two positions indicated in FIG. 6 by solid lines and by dotted lines, to rotate the disc 102 in the forward and reverse directions of arrows 107. In the position of the dog 96 shown in solid lines, the drive motor 29 rotates the worm 98 in a clockwise direction so that such worm will cause the wheel 72 to rotate in one direction, while in the position of the dog shown in dotted lines, the worm is rotated in a counterclockwise direction causing the wheel to be rotated in the opposite direction.

The worm 98 engages the teeth of a worm wheel 108 which is rigidly secured to a sleeve 110 that is fixedly attached to the hub of the carriage wheel 72 so that rotation of the worm wheel 108 causes rotation of the sleeve 110 and the carriage wheel. The carriage wheel 72 and sleeve 110 are rotatably mounted upon a shaft 112 which is fixedly attached to the leg extension 68 of the carriage frame 58. A plastic washer 114 and a metal snap ring 116 are placed over the end of a shaft 112 in order to hold the carriage wheel 72 on such shaft. Thus, a manual movement of the dog 96 so that the leaf spring 106 engages one side or the other of such dog enables reversing the direction of rotation of the carriage wheels to enable the distribution line 18 to move in the opposite direction from that of arrow 24. When this happens, the sprinkling devices 22 are adjusted so that their areas of coverage 26 are on the other side of the distribution line from that shown in FIG. 1.

One embodiment of the common power source 32 which may be employed to intermittently vary the pressure in the closed fluid pressure system including coupling line 30 is shown in FIG. 8. This power source includes a fluid pulser device 118 having a flexible diaphragm 120 of rubber or other suitable material held between the two housing members 122 and 124 which are clamped together by bolts 126 to form a fluid-tight seal. The chamber formed by diaphragm 120 and housing member 122 is connected to the coupling pipe 30 so that it forms part of the closed fluid system and movement of such diaphragm increases and decreases the fluid pressure in such closed fluid system coupling the power source to each of the drive motors 29. This is accomplished by alternately filling and exhausting the other chamber in the pulser 118, formed by the housing member 124 and the diaphragm 120 with irrigation fluid from the telescopic connector member 38 through a solenoid actuated valve 128.

The field winding of the solenoid valve 128 is electrically connected to a battery operated timing device 130 which transmits electrical pulses through such winding in order to alternately open and close the valve 128. When the solenoid valve is open, water flows from the connector member 38 under pressure through a connecting tube 132 into the bottom of the chamber formed by housing 124 and diaphragm 120 rapidly filling such chamber with fluid. This causes the diaphragm 120 to move to the position shown in dotted lines in FIG. 8 which increases the pressure in the closed fluid system. Since the pressure in the closed fluid system is uniform, this increase in pressure is transmitted simultaneously to all of the drive motors 29 and moves the [diaphragm] *diaphragms* 88 of such motors inwardly to the position shown in dotted lines in FIG. 7. As a result, the piston 84 and the dog 96 are also moved outwardly to the position shown in dotted lines. This causes the worm 98 to be rotated through an angle corresponding to the distance between adjacent notches 104 when the force exerted on the piston exceeds that necessary to actuate such motor. This causes the wheels of each of the support carriages 28 to move forward simultaneously by the same amount since the area of the heads of the pistons 84 of all of the motors 29 are substantially the same so that the uniform pressure in the closed fluid system exerts the same force on each of the piston rods.

When the solenoid valve 128 is de-energized, it automatically moves in the closed position shown in FIG. 8 so that the fluid within the chamber of the pulser 118 formed by the housing member 124 and diaphragm 120, is exhausted from such chamber through an outlet in such valve onto the ground. This enables the diaphragm 120 of the fluid pulser 118 to move back to the position shown in solid lines due to the decreased pressure in the closed fluid system and because of the force of the coil springs 86 of the drive motors 29. The dog 96 is thus moved backward across the surface of the worm disc 102 into the next successive notch 104 guided by the leaf spring 106. It should be noted that the disc 102 is provided with a flange extending from the side of the disc about the periphery of such disc to prevent the disengagement of the dog 96 from the disc during its movement between adjacent notches 104. Also the fluid pulser 118 may be provided with a positive return for the diaphragm 120 such as by providing a spring within the chamber formed between such diaphragm and housing member 122 in order to assure that all of the pistons 84 of the drive motors 29 are returned to their normal position when the fluid pulser is exhausted. Of course, the fluid pulser 118 is considerably larger than the piston housings 90 of the drive motors 29 because the volume of fluid displaced by the diaphragm 120 within the closed fluid system must be equal to the total sum of the fluid displaced by each of the diaphragms 88 of the drive motors. However, the pistons 84 are small, for example 2 inches in diameter, and move only a short distance, so it only takes $6/10$ of one gallon of fluid displacement in the fluid pulser 118 to operate sixty-six of the drive-motors so that such fluid pulser is not a cumbersome size. Also, the timer 130 may be provided with an adjustment for the rapidity of actuation of the solenoid valve 128 in order to control the frequency of the force pulses exerted by the fluid pulser, which under ordinary conditions may vary between 1 to 12 pulses per minute depending upon the amount of irrigation desired.

FIGS. 9–23 show a later developed form of the invention which, as shown in FIG. 12, includes a sprinkler pipeline 210p which is supported by wheels 211 for movement over a land area A in a direction at right angles to the length of pipeline 210p. The pipeline 210p and associated parts may be considered as a pipeline means 210, and the pipeline means is initially set up or assembled in a field (or land area to be irrigated) with the length of the pipeline means at right angles to a series or line of stationary valve-equipped water outlets from which the pipeline means is adapted selectively to receive water in a manner to be presently described. The water outlets cannot be conveniently shown in FIG. 12 because they are located too far toward the viewer as the parts are there shown. The relationship of the pipeline means 210 to the water outlets is however shown in the diagrammatic plan views, FIGS. 9–11 and 14. There, it is evident that the pipeline means 210 is disposed at right angles to a linear series of water outlets (only two, 215a and 215b, being shown), so that the pipeline means 210 will travel in a direction D (FIG. 9) which is parallel to the line of stationary water outlets.

The water outlets are supplied with water under pressure in any desired manner, such as by a main 217, which in turn receives water under pressure from a source, which may be a pump (not shown) located at an irrigation ditch or canal. The outlets are regularly (equally) spaced relative to one another, and the valves of such water outlets are closed, except for the one supplying water to the pipeline means 210.

Adjacent and parallel to the line of water outlets 215a and 215b (and thus at right angles to the pipeline means 210) is a hollow tubular telescopic assembly 221 (FIGS. 9, 12 and 14) which is connected at its rear end by a connecting pipe 223 to a selected stationary water outlet, say outlet 215a. At its other or front end, the telescopic assembly 221 is connected to the pipeline means 210 so that as the pipeline means 210 advances over the ground area A and the telescopic assembly 221 extends, water under pressure is continuously and uninterruptedly supplied to the pipeline means 210 from the selected stationary water outlet 215a for the full period of extension of the telescopic assembly 221.

The telescopic assembly is designed so that the distance it extends is equal to (from a practical standpoint, slightly greater than) the distance between two adjacent water outlets. However, if by any chance the outlets happen to be closely located, the assembly could extend a distance twice, or a multiple of, the distance between two adjacent outlets.

After the telescopic assembly has been fully extended the pipeline means will have advanced from the full line position in FIG. 9 to the broken line position in such figure (the manner of extension being better shown in FIG. 14). In such latter position, the head or front end of the telescopic assembly 221 will be located in advance of the next-in-line water outlet 215b a distance equal to the telescoped length of the assembly. Now, the valve at the water outlet 215a can be closed and the rear end of the telescopic supply assembly disconnected from such water outlet. The telescopic assembly 221 may now be contracted as indicated in FIG. 10 to a telescoped condition, by a mechanism, to be presently described, to locate the rear end of the assembly opposite the water outlet 215b. Such rear end can now be connected to such water outlet and the valve at such outlet turned on to facilitate continued advancement of the pipeline means 210 over the ground area A, with only a brief interruption in irrigation of the area.

When the mobile pipeline means has advanced a distance such that the telescopic assembly is again fully extended, the pipeline means will be disposed in advance of a succeeding water outlet (not shown) and the steps above mentioned can be repeated so that irrigation of the area A can continue for the full length of the line of water outlets.

The direction of advancement of the pipeline means and the telescopic assembly can be reversed (in a manner previously described in connection with the FIG. 1 form of the invention) so that the same area can be irrigated a second time, and reversed again as many times as desired to effect repeated irrigation of the area A.

The FIG. 1 and FIG. 12 forms of the invention are alike in many ways, but one difference is that in the FIG. 1 form, the rate of extension of the telescopic assembly is determined by a timing means at 50–54 whereas in the FIG. 12 form, the rate of extension is determined by the effective rate of movement of the pipeline means 210. This difference is important because it is immaterial to the FIG. 12 form of the invention whether or not the contour of the strip is the same as that of the area over which the pipeline 210p travels. It is known that in many existing cultivated areas that the water outlet line is located an a flat strip near a fence while the remainder of the area is undulating in contour, such as for instance, where the furrows run at right angles to the water outlet strip. This situation is depicted in FIG. 13, where the water outlet strip $A_1$ is flat while the cultivated area $A_2$ is undulating. Thus, this requires that the actual rate of travel of the pipeline means be greater than the rate of telescopic extension of the assembly 21. In other fields, the area $A_1$ and strip $A_2$ may both be relatively flat so that the actual rate of travel of the pipeline means and the rate of extension of the telescopic assembly would need to be the same.

Since in the FIG. 12 form of the invention, the rate of travel of extension of the telescopic assembly is controlled or regulated so that it is the same as the effective rate of movement of the pipeline means, differences in the terrain for the pipeline means and the telescopic assembly assumes no importance.

SPECIFIC DESCRIPTION

Referring particularly to FIG. 12, the telescopic assembly 221 includes a plurality of conduit sections, four 221a, 221b, 221c and 221d being shown, which decrease in diameter from the rear end of the assembly to the front or head end thereof as is evident from FIGS. 12 and 14. The conduit section may be pieces of standard irrigation pipe telescoped one within the other. For convenience section 221a may be called the outer or rear section, section 221b the outer-intermediate section, section 221c the inner-intermediate section, and section 221d the front or inner section.

Each of the conduit sections 221b, 221c and 221d has full length sliding contact with the adjacent (outer) section within which it fits. FIG. 15 shows a seal 231 provided on the rear end of section 221b, which seal sealingly engages the interior of section 221a in which it fits. Although full length contact is not necessary, it does give the maximum inner diameter front section 221d for any given diameter rear section 221a and thus gives maximum flow for any given outer diameter rear section.

The rear section 221a has two pairs of wheels, a rear pair 233 and a front pair 235, each being mounted on said section by a split clamp numbered 237 for rear wheels 233 and 239 for the front wheels 235. Each clamp 239 has axles 241 for its wheels.

A pair of pendulum gravity locks 243 are carried by a bracket 245 and engage lugs 247 on the wheels 233 to prohibit rearward or counterclockwise movement of the wheels. Thus, extension of the tlescopic assembly must occur forwardly. However, the locks do not prevent forward movement of the wheels 233, which is necessary for a reason presently to be described.

The conduit section 221b has only one pair of wheels 251 mounted by a split clamp 253 on the head end of such section. Likewise, conduit section 221c has only one pair of wheels 255 which are located at its head and there mounted by a split clamp 257. Conduit section 221d is supported adjacent its head end by a pair of wheels 259, about which more will be said presently. *Section 221d and its wheels and related structures can be considered as a mobile water-conducting means, or as a head rig, or as a traveling water supply means. Sections 221a, 221b and 221c may be considered as a conduit means for conducting water from a stationary source of water under pressure to the head rig or mobile means 221d.*

An arrangement is provided to limit the extension of and hence prevent separation of the various conduit sections and comprises a fixed length cable or wire section between each pair of adjacent conduit sections. The several cable or wire sections can be provided by various portions of a single cable as evident from FIG. 12 where the cable generally entitled 261 is secured at its rear end to the rear conduit section 221a, at its front end to the front conduit section 221d and at intermediate places to the intermediate sections 221b and 221c. Securement at such places is by way of the split clamps 239, 253 and 257 and an eye 265 on conduit section 221d. At the split clamps, the cable is clamped between one set of the ears of the split clamps, as shown in the case of clamp 253 in FIG. 18.

It is evident that even if there are differences in friction or effective piston area between the conduit sections to cause projection of certain conduit sections first, after they have been projected the full extent as determined by the halter effect of the associative cable portions, further extension of the telescopic assembly occurs by projection of the remaining conduit sections.

At its head end, the innermost conduit section 221d is secured to a tubular member 271 which has a horizontal portion 271a and a vertical portion 271b. The latter projects upwardly into an upper tubular member 273 which is rigidly connected by a fitting 275 to an end of the pipeline 210p. Upper tubular member 273 is mounted on the vertical portion 271b for swiveling or turning movement with respect thereto about the common vertical axis of said member and portion for a reason presently to be described.

The mounting means is shown in FIGS. 12, 25 and 26 and comprises a split grooved annular connector 281 having a pivot 283 and a removable locking bolt 285. The grooved connector slidably embraces a circular flange 287 secured around the tubular portion 271b. The grooved connector also slidably embraces a flange 291 formed on the lower end of the upper member 273. An annular seal 293 fits within an enlarged portion 295 of member 273. Thus a sealed rotary joint J is provided between member 273 and member 271, and such joint takes end thrust and thus prevents axial separation of such members under the urging of the water pressure therein. *The joint J may also be considered as a swivel joint.*

The sprinkler pipeline 210p of the sprinkler pipeline means 210 is constructed like distribution pipe 18 of the FIG. 1 form of the invention and pipeline 210p is supported by a plurality of A-frame carriages 297 whose construction is essentially like that of the carriages of the FIG.1 form. The carriages include wheels 211 (previously mentioned) which are individually driven by fluid motors (not shown in FIG. 12) of the same construction and in the same manner as described in connection with the FIG. 1 form, there thus being a pulsator P for supplying the fluid motors with pulsating water pressure. Thus the pipeline means 210 will be driven in a direction at right angles to its length, and the telescopic assembly is also driven in the same direction by virtue of the water pressure therein urging extension of the assembly.

A control arrangement is provided for synchronizing the movements of these two self-driven mechanisms, and particularly to synchronize such movements so that the head end of the telescopic assembly keeps pace with the pipeline means. It has been mentioned above that the tubular members 271 and 273 are connected by a rotary joint J. This joint provides for relative turning or swiveling movement of the members 271 and 273 whenever a *differential* exists between the effective rates of travel thereof. A control means is responsive to such turning movement to alter the rate of extension of the telescopic assembly so that its overall effective rate is the same as the overall effective rate of the sprinkler pipeline means.

The control means includes a drum 301 and cable 303 much like drum 46 and cable 40 unit of the FIG. 1 form. The drum is rotatably mounted on a pair of bracket plates 305, the latter being secured to the tubular member 271 and having axles for the ground wheels 259. The cable 303 extends from the drum rearwardly through a guide means provided by the upper clearance spaces in the split clamps 257 and 253, as shown in the case of clamp 253 in FIG. 18. The rear end of the cable is secured to the rear clamp 239 or at any other convenient place to the conduit 221a.

As the telescopic assembly extends, and the drums 301 is thus carried forwardly, the cable 303 naturally unwinds from the drum. To control such unwinding, a brake is provided for the drum and is best shown in FIGS. 12, 16 and 17. While the brake can assume various forms, the particular form shown includes a brake strap or band 307 which embraces a brake drum 309 and is secured at its ends to a pair of cross rods 311 and 312. The latter rod is fixed to ears on the bracket plates 305, while rod 311 is carried by a bail-like lever 313. The lever is pivotally mounted at its lower ends on the plates 305 by pivot bolts 315 which are located below the level of the rod 311 as is evident from FIG. 17.

A control rod 321 (FIG. 12) is pivotally connected at its ends by means of clevises 323 to the lever 313 and to an ear or lug 325 on the tubular member 273, and has a turn-buckle 327 intermediate its length to permit adjustment of its length for initial adjustment of the system. At such initial adjustment, the parts are arranged with the head end of the telescopic assembly (which head end may be considered as the vertical tubular portion 271b) in line with the pipeline 210p as regards the direction of travel of the pipeline means and the telescopic assembly. The control rod length is now adjusted so that the brake is set, but such brake will be released upon a few inches of advancement of the pipeline means beyond the head end of the telescopic assembly because such advancement will cause a slight but effective turning movement of the tubular member 273 relative to the member 271. This turning movement is clockwise as the member 273 would be viewed in plan in FIG. 12 to swing the lever 313 counterclockwise to release the brake. Now, the fluid pressure in the telescopic assembly causes further extension of such assembly, and this extension is effective to cause a return of tubular member 273 to a position in alignment with pipeline means 210. This extension also causes resetting of the brake because advancement of the telescopic assembly at a rate greater than that of the pipeline means causes a counterclockwise movement of the tubular member 273 relative to the tubular portion 271b.

In practice, the advancement of the telescopic assembly may occur with a drag at the brake rather than alternations between set and released conditions of the brake.

It should be pointed out that there is enough flexibility in the first section or portion of the pipe 210p to facilitate turning movement of the member 273 relative to the member 271.

When the telescopic assembly 221 has been fully extended, an irrigation-water control valve 331 (FIGS. 12, 21 and 22) is actuated to close off flow of water through the assembly. The valve comprises a tiltable disc having a trunnion 333 and a stem 335 mounting such disc within the tubular member 271 just forwardly of the conduit section 221d.

The valve is normally open as shown in FIGS. 21 and 22 but will be closed by a piston 337 of a piston and cylinder unit whenever a knob 339 secured to the cable 303 engages a ring 341 through which the cable passes. The ring 341 is the end link of a chain 342 connected to the operating lever 343 of a normally closed ball or plug valve 345, the latter being mounted on the conduit 211d and receiving water therefrom, upstream of the irrigation water valve 331, by means of a short inlet pipe 347. A tension spring 349 urges the lever against a stop 351 (FIG. 22).

A tube 353 connects the outlet of the valve 345 to the cylinder 355 for the piston 337, the cylinder being mounted at 357 on the conduit section 221d (FIG. 21).

When the knob 339 engages the ring 341 and pulls on the chain sufficiently to open valve 345, fluid under pressure is supplied to the cylinder 355, whereby to force the piston 337 to the right as the parts are shown in FIG. 21. The piston is effective through a slotted lever 361 (FIG. 22) to close the valve 331. This cuts off the supply of water to the pipeline means 210. Shortly thereafter the flexible cable or line 361 is fully extended so that it halts further extension of the telescopic assembly.

Now, the telescopic assembly is disconnected from the associated stationary water outlet and a handle can be applied to (or is already on) the shaft of the drum 301 and the drum rotated in a counterclockwise direction (as the parts are shown in FIG. 12) to contract the telescopic assembly in a direction toward the head end thereof, the head end being precluded against rearward movement by pendulum locks 365 (FIG. 12) which co-act with lugs 247 on the wheels 259. It is pointed out that the pendulum locks 243 on the rear wheels 233 do not prevent forward movement of the rear end of the telescopic assembly, and thus the telescopic assembly is contracted forwardly to relocate it in operative relation to the next stationary water outlet (or a desired one, in the event the outlets are closely spaced).

As previously mentioned, the carriages 297 are much like the carriages of the FIG. 1 form of the invention, but there are some differences. In the FIG. 1 form there is a saddle member 60 which engages the hollow carriage legs and also engages the distribution or sprinkler pipeline 18. In FIG. 20 it is evident that the saddle member is made in two pieces; a lower hollow member 371 receiving the hollow legs 373 of the carriage, and an upper saddle piece 375 directly engaging the sprinkler pipe 210p. The lower member 371 has a pair of oppositely projecting nipples 377 for receiving the plastic tubing 379 which connects the pulsator P to the carriages, and the carriages to one another.

The lower member is blind at its upper end as is evident from FIG. 20 and has a laterally extending shoulder element 381 nesting within and secured to a channel portion 383 provided by the upper saddle piece 375.

The pipeline 210p is clamped onto the saddle piece by a semicylindrical cap piece 385 which is bolted to the saddle piece. The cap piece 385 carries a post or standard 387 (FIGS. 20 and 12) from the top of which extend guy wires 389. The lower ends of the guy wires are connected to suitable eyes 391 carried by the pipeline 210p.

FIG. 23 shows pulsator P, which is like the pulsator or power source 32 of the FIG. 1 form of the invention except that the arrangement in FIG. 23 does not have a pulser device 118. Instead, water under pressure from the sprinkler pipeline 210p is controlled by the timer 130 and solenoid valve 128 so that in alternating fashion it is supplied to the wheel drive motors through hose 379 and then isolated from such motor and the pressure of the motor actuating fluid expended through an outlet line 401 leading to the atmosphere. Thus, the wheel drive motors are simultaneously actuated to move the associated wheels in unison in the direction of travel of the pipeline means.

It is pointed out that in FIG. 12, the pulsator P is mounted on the pipeline 210p, while in FIG. 1, it is on [the head end of] the telescopic assembly. It may be located in any desired position on the pipeline means or telescopic assembly, but if located on the telescopic assembly, it must be located on the head end or difficulties in conduiting will otherwise result.

FIG. 24 shows a modified form of the invention which is like the FIG. 12 form except there is a second pipeline means 410 like the pipeline means 210 and having a pipeline 410p connected by a conventional irrigation pipe joint 411 to a stub tube piece 413. The latter is secured to the fitting 275, the fitting being a T-type fitting having one end closed by a cap 275a in FIG. 12, but such cap being removed in FIG. 24 and the stub tube piece 413 substituted therefor.

It is pointed out that the pipeline 410p is not rigidly connected to the fitting 275 as is the pipeline 210 and this is necessary so that the pipeline means 410 does not interfere with the operation of the speed control mechanism for the telescopic assembly 221. Only the control rod of such control mechanism is shown in FIG. 24. Thus, the pipeline means 410 merely "tags along" with the first pipeline means 210 (being driven by its fluid motors at the same rate of speed) without interfering with the coaction between the pipeline means 210 and the telescopic assembly 221.

While the FIG. 12 form of the invention has four conduit sections, it could have more or less sections if desired. While the cable 303 is shown guided by the clamps 257 and 253, it need be only guided at clamp 257 by the clamp or any other suitable guide means. While only two water outlets 215a and 215b are shown, it will be appreciated that the number of outlets will usually be quite sizeable. It will be understood that while the potential rate of extension of the telescopic assembly is greater than the rate of travel of the pipeline means, its actual overall *rate* will be controlled so as to be the same as that of the pipeline means. There of course will be momentary differences in the rates of travel of the pipeline means and the telescopic assembly, but the overall rates will be the same.

The various carriages of the pipeline means may travel over terrain of varying contours during irrigation of a land area, and this may cause some slight misalignment of certain carriages relative to the remainder, but, when the direction of travel of the pipeline means is reversed, the carriages will return over the same paths as before and thus effect realignment of the carriages with one another. The flexibility of the pipeline 210p will permit the misalignment mentioned above.

An important advantage of my irrigation system is the ease and relative low cost by which an existing irrigation system can be converted to my system. A typical existing system will have a sprinkler pipeline manually or otherwise shifted from outlet to outlet of a line of water outlets to effect irrigation of a ground area. By purchasing my telescopic assembly, a number of my carriages to adequately support the owner's pipeline, and a pulsator (together with plastic or other suitable hose or conduit supply lines), the existing system can be converted. Thus, the owner saves his existing sprinkler pipeline.

The terms "ground area," "field," "area," "land area," "ground," etc., are used herein interchangeably and are meant to designate the terrain to be irrigated, whether it be under cultivation or not.

While I have shown a control system having a single vertical axis rotary joint, the control could be effected by the use of a first horizontal-axis rotary joint at the pipeline 210p and another at the front end of the telescopic assembly 221, connected by a generally vertical pipe having a short telescopic joint. The control rod 321 would then be connected to such pipe to control the rate of movement of the telescopic assembly.

The telescopic assembly 221 may also be considered as a telescopic wheeled supply conduit rig.

The connecting pipe 223 in FIG. 9 is actually a member separable from the telescopic assembly, but it could be permanently connected thereto if desired. In practice, the connecting pipe is disconnected from the associated water outlet and the rear conduit section 221a and and carried forwardly and connected to the next water outlet. When the rear conduit section has been winched forwardly sufficiently to be located adjacent to such connecting pipe, the pipe is connected to such section.

It will be appreciated that there is a seal 231 like that in FIG. 15 provided on the rear end of each of the conduit sections 221b and 221d to form a sliding seal with the conduit sections 221a and 221c, respectively.

One of the most important advantages of my invention is the even distribution of water over the ground area. Heretofore, with the laterals in fixed positions while sprinkling, the attempt was to cover square areas with sprinkling devices having circular distribution patterns.

With my system, where the sprinklers are moving while sprinkling, each sprinkler covers a rectangular strip uniformly and evenly, in a manner not unlike that achieved by the coverage of the Palmer spiral in wiring courses, or in the manner of a sheet or blanket being pulled uniformly over a bed from the foot end toward the head end.

My system also effects superior distribution under wind condition because the whole pattern of water sprinkling is shifted. Since the pattern is merely shifted, this would in no way adversely affect the uniform distribution obtained, because the pipeline means merely marches up the field with the shifted pattern uniformly distributing water over the ground area.

My system is much lighter than existing side roll systems, about half as much. The side roll system is also much bulkier than my system, by having the large ground wheels and associated structure. Thus my system is much more compact in shipping than the side roll system by a compactness ratio of 4 or 5 to 1.

Another advantage of my invention is that the height of the sprinkler pipeline or lateral is independent of the size of the ground wheels, which is not the case with side roll systems. In fact my pipeline or lateral can be readily disposed at a level five feet about the ground without side bracing (unless desired) and can be located even ten or fifteen feet if desired, but bracing for the carriage A-frame would be necessary or desirable. With a pipeline or lateral located at only five feet, the pipeline will move right over, not through, many crops, such as cotton, corn, grapes, maize, etc.

In FIG. 20, the legs 373 are shown pressed over the legs of the member 371 rather than being pressed into such legs as is shown in the partial diagrammatic disclosure in FIG. 12.

The conduit section 221d is preferably connected to the member 271 by a rotary joint like joint J so that at the end of a field, the head rig can be disconnected from the telescoped conduits, the conduits picked up and carried around to the opposite side of the head rig, the head rig turned 180°, the joint reconnected so that irrigation in the opposite direction can commence.

Having described the invention in what is considered to be the preferred embodiment thereof, it is desired that it be understood that the invention is not to be limited other than by the provisions of the following claims.

*While the conduit means is shown as being of telescopic form, the invention is not intended to be limited to such form unless such form is specifically recited is a claim.*

I claim:

1. An irrigation apparatus comprising, sprinkling pipeline means supported for movement across a plot of ground in transverse relation to its direction of travel, wheeled means connected to said pipeline means to conduct water thereto, a connecting assembly for connecting said wheeled [unit] *means* to a source of water under pressure, each means being driven independently of the other but in the same direction, and braking means for controlling the rate of movement of said wheeled means so that such rate corresponds to that of said pipeline means.

2. An irrigation apparatus comprising, sprinkling pipeline means supported for movement across a plot of ground in transverse relation to its direction of travel, wheeled means connected to said pipeline means to conduct water thereto, a connecting assembly for connecting said wheeled means to a source of water under pressure, each means being driven by water under pressure independently of the other but in the same direction, and means independent of said connecting assembly for controlling the rate of movement of said wheeled means so that such rate corresponds to that of said pipeline means.

3. An irrigation apparatus comprising, sprinkling pipeline means supported for movement across a plot of ground in transverse relation to its direction of travel, wheeled means connected to said pipeline means to conduct water thereto, a connecting assembly for connecting said wheeled unit to a source of water under pressure, each means being driven by water under pressure independently of the other but in the same direction, and means responsive to a differential in the rate of movement of said wheeled means and sprinkling pipeline means to vary the rate of movement of the wheeled means so that it corresponds to that of the pipeline means.

4. In combination:

a plurality of stationary water outlets regularly spaced from one another in linear fashion along a predetermined line on a ground area to be irrigated, sprinkler pipeline means supported for movement over said area in a direction parallel to said water outlet line with said pipeline normal to such line, a horizontal telescopic water supply unit arranged parallel and adjacent to said water outlet line and connected at one end to said pipeline means for conducting water thereto while said pipeline means is traveling, means detachably connecting the other end of said telescopic unit to a selected stationary water outlet, said telescopic unit being extensible a distance at least equal to the distance between adjacent water outlets whereby to facilitate advancement of said pipeline means along said area from one outlet to the next while uninterruptedly receiving water from said selected water outlet, whereupon said telescopic unit can be detached from said selected water outlet, contracted and reconnected to the next stationary water outlet, whereafter irrigation of said ground area can recommence and proceed in like fashion for the extent of said water outlet line, said telescopic unit including end telescopic sections and plural intermediate telescopic sections, said sections being arranged so that one end of each is disposed within an adjacent section and one end of each is exposed, the end section nearest said sprinkler pipeline having wheel means supporting the same and located at the exposed end thereof, each intermediate section having wheel means for supporting the same located at the exposed end thereof, whereby although said sections are supported by wheels, these do not interfere with the telescopic function of said sections.

5. An irragation apparatus to receive water under pressure selectively and progressively from a plurality of stationary water outlets regularly spaced from one another in linear fashion along a predetermined line on a ground area to be irrigated, sprinkler pipeline means supported for movement over said area in a direction parallel to said water outlet line with said pipeline normal to such line, a horizontal telescopic water supply unit arranged parallel and adjacent to said water outlet line and connected at one end to said pipeline means for conducting water thereto while said pipeline means is traveling, means detachably connecting the other end of said telescopic unit to a selected stationary water outlet, said telescopic unit being extensible a distance substantially equal to the distance between adjacent water outlets whereby to facilitate advancement of said pipeline means along said area from one outlet to the next while uninterruptedly receiving water from said selected water outlet, whereupon said telescopic unit can be detached from said selected water outlet, contracted and reconnected to the next stationary water outlet, whereafter irrigation of said ground area can recommence and proceed in like fashion for the extent of said water outlet line, said telescopic unit including end telescopic sections and plural intermediate telescopic sections, said sections being arranged so that one end of each is disposed within an adjacent section and one end of each is exposed, the end section nearest said sprinkler pipeline having wheel means supporting the same and located at the exposed end thereof, each intermediate section having wheel means for supporting the same located at the exposed end thereof, whereby although said sections are supported by wheels, these do not interfere with the telescopic function of said sections.

6. A traveling-while-sprinkling irrigation system for irrigating an area having a plurality of stationary water-under-pressure outlets spaced in linear fashion from one another along a predetermined line, an elongate mobile pipeline means wheel supported for movement across such area in a direction parallel to said water outlet line and at right angles to the length of said pipeline means, said pipeline means having a pipeline equipped with water discharge means located therealong for sprinkling said area as said pipeline means travels thereacross in transverse relation to its line of travel, means whereby water-under-pressure supplied to said pipeline means serves to drive it across said area in the fashion described above, an elongate horizontal linear telescopic wheeled supply conduit rig arranged parallel to said water outlet line adjacent thereto and at right angles to said pipeline means and extensible horizontally from a collapsed telescoped condition to an extended condition, said conduit rig including a plurality of telescopically related horizontal conduit sections, first connecting means for detachably connecting one end of said supply conduit rig to a selected stationary water outlet, second connecting means connecting the other end of said supply conduit rig to said pipeline means whereby water-under-pressure from said selected stationary water outlet is conducted to said pipeline means, drive means whereby water-under-pressure supplied to said supply conduit rig serves to cause extension of said supply conduit rig as said pipeline means advances across said area to continuously supply water under pressure to said pipeline uninterruptedly during the period of time during which said supply conduit rig is extending from its collapsed to its extended condition, said supply conduit rig being at a level lower than that of said pipeline, said second connecting means including upper and lower coaxial tubular members connected for relative turning movement about their common axis in response to a differential in the rates of advance of said pipeline means and said supply conduit rig, means rigidly connecting said upper tubular member to said pipeline, said lower tubular member being rigid with a horizontal portion of said second connecting means, said drive means urging said supply conduit rig to extend at a rate exceeding that of said pipeline means whereby to cause relative turning movement of said upper and lower tubular members, and means responsive to such relative turning movement for regulating the overall rate of extension of said supply conduit rig so that it is equal to that of said pipeline means to effect concurrent advancement of said supply conduit rig with said pipeline means as the latter advances across said area.

7. A traveling-while-sprinkling irrigation system for irrigating an area having a plurality of stationary water-under-pressure outlets spaced in linear fashion from one another along a predetermined line, an elongate mobile pipeline means wheel supported for movement across such area in a direction parallel to said water outlet line and at right angles to the length of said pipeline means, said pipeline means having a pipeline equipped with water discharge means located therealong for sprinkling said area as said pipeline means travels thereacross in transverse relation to its line of travel, means whereby water-under-pressure supplied to said pipeline means serves to drive it across said area in the fashion described above, an elongate horizontal linear telescopic wheeled supply conduit rig arranged parallel to said water outlet line adjacent thereto and at right angles to said pipeline means and extensible horizontally from a collapsed telescoped condition to an extended condition, said conduit rig including end telescoping sections and a plurality of intermediate telescopically related horizontal conduit sections, said sections being arranged so that one end of each is disposed within an adjacent section and one end of each is exposed, the end section nearest said sprinkler pipeline having wheel means supporting the same and located at the exposed end thereof, each intermediate section having wheel means for supporting the same located at the exposed end thereof, whereby although said sections are supported by wheels, these do not interfere with the telescopic function of said sections, first connecting means for detachably connecting one end of said supply conduit rig to a selected stationary water outlet, second connecting means connecting the other end of said supply conduit rig to said pipeline means whereby water-under-pressure from said selected stationary water outlet is conducted to said pipeline means, drive means whereby water-under-pressure supplied to said supply conduit rig serves to cause extension of said supply conduit rig as said pipeline means advances across said area to continuously supply water under pressure to said pipeline uninterruptedly during the period of time during which said supply conduit rig is extending from its collapsed to its extended condition.

8. An irrigation apparatus comprising, sprinkling pipeline means supported for movement across a plot of ground in transverse relation to its direction of travel, a plurality of telescopically related and extensible tubular water conducting conduit sections arranged at right angles to the length of said pipeline means and adapted to be connected at one end to a stationary water outlet and at its other end to said pipeline means to conduct water under pressure thereto, said conduit sections progressively decreasing in diameter from one end thereof to the other and each pair of adjacent sections having an outer-to-inner diameter relationship such that the inner of such sections has substantially full length contact with its outer section, connecting means for each pair of adjacent sections connected between the outer of such sections and the inner of such sections and positively halting the extension of such sections after predetermined extension thereof, whereby after a pair of adjacent sections has been fully extended, the forces urging extension of said conduit sections are effective to cause extension of any remaining pairs of adjacent sections not yet fully extended, the connecting means of each pair of sections, except the pairs including the end sections, being connected to the front ends of the associated sections, said conduit sections including telescopic end sections and plural intermediate telescopic sections, said sections being arranged so that one end of each is disposed within an adjacent section and one end of each is exposed, the end section nearest said sprinkler pipeline having wheel means supporting the same and located at the exposed end thereof, each intermediate section having wheel means for supporting the same located at the exposed end thereof, whereby although said sections are supported by wheels, these do not interfere with the telescopic [functions] *function* of said sections.

9. An irrigation apparatus comprising, sprinkling pipeline means supported for movement across a plot of ground in transverse relation to its direction of travel, a plurality of telescopically related and extensible tubular water conducting conduit sections arranged at right angles to the length of said pipeline means and adapted to be connected at one end to a stationary water outlet and at its other end to said pipeline means to conduct water under pressure thereto, said conduit sections progressively decreasing in diameter from one end thereof to the other and each pair of adjacent sections having an outer-to-inner diameter relationship such that the inner of such sections has substantially full length contact with its outer section, elongate flexible connecting means for each pair of adjacent sections connected between the outer of such sections and the inner of such sections and positively halting the extension of such sections after predetermined extension thereof, whereby after a pair of adjacent sections has been fully extended, the forces urging extension of said conduit sections are effective to cause extension of any remaining pairs of adjacent sections not yet fully extended, the connecting means of each pair of sections, except the pairs including the end sections, being connected to the front ends of the associated sections, said conduit sections including telescopic end sections and plural intermediate telescopic sections, said sections being arranged so that one end of each is disposed within an adjacent section and one end of each is exposed, the end section nearest said sprinkler pipeline having wheel means supporting the same and located at the exposed end thereof, each intermediate section having wheel means for supporting the same located at the exposed end thereof, whereby although said sections are supported by wheels, these do not interfere with the telescopic function of said sections.

10. An irrigation system for sprinkling-while-traveling across an area comprising, an elongate mobile pipeline means wheel supported for movement across such area in a direction parallel to said water outlet line and at right angles to the length of said pipeline means, said pipeline means having a pipeline equipped with water discharge means located therealong for sprinkling said area as said pipeline means travels thereacross in transverse relation to its line of travel, a horizontal telescopic water-conducting pipe assembly having a front end and a rear end and supported for extension fro ma contracted condition to an extended condition in a direction at right angles to said pipeline means, means for conducting water under pressure to said rear end, the front end of said assembly being connected to said pipeline means to conduct water under pressure thereto, said pipe assembly including a plurality of pipes of differing diameters so that water pressure therein urges extension of said assembly, means for anchoring said rear end of said pipe assembly to prohibit rearward movement thereof whereby said pipe assembly extends in a forward direction, means independent of the extension of said pipe assembly and for receiving water under pressure and serving to drive said pipeline means across an area in a direction at right angles to the length of said pipeline means and at a rate independent of the rate at which said pipe assembly is urged to extend, and braking means for regulating the rate of extension of said pipe assembly so that the front end of said pipe assembly keeps pace with the advance of said pipeline means.

11. In combination, a plurality of stationary water outlets regularly spaced from one another in linear fashion along a predetermined line along an area, sprinkler pipeline means supported for movement along said area in a direction parallel to said water outlet line with said pipeline means normal to such line, a horizontal telescopic water supply unit arranged parallel to said water outlet line and connected at one end to said pipeline means for conducting water thereto while said pipeline means is traveling, means detachably connecting the other end of said telescopic unit to a selected stationary water outlet, said telescopic unit being extensible a distance at least substantially equal to the distance between adjacent water outlets whereby to facilitate advancement of said pipeline means along said area from one outlet to the next while uninterruptedly receiving water from said selected water outlet, whereupon said telescopic unit can be detached from said selected water outlet, means independent of said sprinkler pipeline means for anchoring the front end of said telescopic unit against rearward movement, and means carried by said telescopic unit for pulling forwardly the remainder of said telescopic unit to contract it and relocate said telescopic unit adjacent said next water outlet whereupon said one end of said telescopic unit can be connected to said next water outlet to continue irrigation of said area.

12. In a self-propelled traveling irrigation apparatus comprising, a sprinkler pipe for travel over an area to be irrigated in a direction at right angles to the length of the pipe, the pipe being adapted to receive water to be sprinkled from a telescopic wheeled supply, a plurality of wheel means distributed along said pipe and supporting the same, each wheel means including a structure rigid with said pipe and at least one ground engaging wheel mounted on said structure for rotation about an axis generally parallel to the length of the pipe, each wheel means including a piston type fluid motor carried by said structure, each fluid motor being operatively associated with a ground engaging wheel, a worm rotatably mounted on said structure but held against bodily rotation with said associated ground engaging wheel, a worm wheel for each worm and engaged thereby and being fixedly secured to a ground engaging wheel coaxially of the latter so that said ground engaging wheel is locked against movement except that imparted thereto by said worm and so that there is a speed reduction from said worm to said worm wheel whereby said worm may be actuated by a relatively small force, means operatively connecting each fluid motor to the associated worm for converting the rectilinear motion of the piston of such motor into rotary motion, means connected in common to said fluid motors and receiving water from said supply and operable to create a pulsing water pressure supply which is simultaneously conveyed to said fluid motors to cause them to simultaneously actuate the same extent.

13. Sprinkling apparatus, comprising:

a distribution pipe, a main fluid conduit having a plurality of longitudinally spaced outlets, a plurality of sprinkler devices connected to the interior of said distribution pipe at longitudinally spaced positions along said distribution pipe, telescope connection means for releasably connecting said distribution pipe to one of said outlets of said main conduit so that said pipe extends laterally from said conduit and fluid is transmitted from said conduit through said distribution pipe to said sprinkler devices, for allowing movement of said pipe along said conduit during the transmission of fluid through said pipe, a plurality of support carriages attached to said distribution pipe at longitudinally spaced positions along said distribution pipe to support said distribution pipe above the ground, each of said carriages including a hollow frame and a pair of wheels secured to said frame on opposite sides of said distribution pipe, a plurality of motor means each mounted on one of said carriages for rotating at least one of the wheels on each of said carriages the same fixed distance to enable movement of said distribution pipe over the ground to a substantially straight line, said motor means including a worm rotatably mounted on said frame, a worm gear fixedly secured to said one wheel in engagement with said worm, a piston, and a dog member connected to said piston for engagement with one of a plurality of detent holes in the end of said worm to rotate said worm and said worm gear in response to longitudinal movement of said piston, and power means for intermittently actuating each of said motor means, simultaneously in order to move said distribution pipe in a substantially straight line a uniform distance, said power means including a coupling pipe supported by said distribution pipe and connected to the interior of the hollow frames of said carriages to form a closed fluid system for the transmission of power, said closed fluid system having a plurality of flexible diaphragms operatively arranged to move the piston of each of said motor means and having another flexible diaphragm connected to a pulser device from moving said another diaphragm to alternately increase and decrease the pressure uniformly in said closed fluid system to move said plurality of diaphragms at the same rate so that said pistons cause movement of said carriages.

14. Sprinkling apparatus, comprising:

a distribution pipe, a main fluid conduit having a plurality of longitudinally spaced outlets, a plurality of sprinkler devices connected to the interior of said distribution pipe at longitudinally spaced positions along said distribution pipe, telescope connection means for releasably connecting said distribution pipe to one of said outlets of said main conduit so that said pipe extends laterally from said conduit and fluid is transmitted from said conduit through said distribution pipe to said sprinkler devices, for allowing movement of said pipe along said conduit during the transmission of fluid through said pipe, a plurality of support carriages attached to said distribution pipe at longitudinally spaced positions along said distribution pipe to support said distribution pipe above the ground, each of said carriages including a hollow frame and a pair of wheels secured to said frame on opposite sides of said distribution pipe, a plurality of motor means each mounted on one of said carriages for rotating at least one of the wheels on each of said [cariages] *carriages* the same fixed distance to enable movement of said distribution pipe over the [gound] *ground* in a substantially straight line, said motor means including a worm rotatably mounted on said frame, a worm gear fixedly secured to said one wheel in engagement with said worm, a piston, and a dog member connected to said piston for engagement with one of a plurality of detent holes in the end of said worm to rotate said worm and said worm gear in response to longitudinal movement of said piston, and power means for intermittently actuating each of said motor means simultaneously in order to move said distribution pipe in a substantially straight line, said power means including a coupling pipe supported by said distribution pipe and connected to the interior of the hollow frames of said carriages to form a closed fluid system, said closed fluid system being connected between each of said motor means and a common pulser means for applying pulses of fluid pressure to the pistons of said motor means.

15. Drive mechanism for moving an elongated structure comprising:

a hollow support frame adapted to be attached to said structure, a plurality of wheels rotatably mounted on said support frame, a housing member secured to said support frame adjacent one of said wheels, a flexible diaphragm attached to said housing member to form a fluid tight chamber, a passageway communicating with the interior of said chamber, coupling means connected to the interior of said frame for transmitting fluid through said passageway into and out of said chamber to move said diaphragm between stretched and relaxed positions in response to variations of fluid pressure, a drive member supported outside of said chamber in a position to be moved by said diaphragm between extended and retracted positions, and means connected between said drive member and said one wheel for rotating said one wheel in response to movement of said drive member through a predetermined distance for each complete cycle of movement of said drive member through said extended and retracted positions.

16. Drive mechanism for moving a fluid conduit, comprising:

a hollow support frame including a saddle portion adapted to be attached to said conduit and a pair of leg portions extending from said saddle portion, a pair of wheels rotatably mounted on said leg portions of said frame, a housing member secured to said frame adjacent one of said wheels, a flexible diaghragm attached to said housing member to form a fluid tight chamber, a passageway communicating with the interior of said chamber, coupling means connected to the interior of said frame to form a closed fluid system for transmitting fluid through said passageway into and out of said chamber to move said diaphragm between stretched and relaxed positions in response to variations of fluid pressure, a plunger member supported outside of said chamber in a position to be moved by said diaphragm between extended and retracted positions, and means connected between said plunger member and said one wheel for rotating said one wheel in response to movement of said plunger member through a predetermined distance for each complete cycle of movement of said plunger member through said extended and retracted positions.

17. Drive mechanism for moving an irrigation line, comprising:

a hollow support frame including a saddle portion adapted to be attached to said irrigation line and a pair of tubular leg portions extending from said saddle portion and forming an acute angle, a pair of wheels rotatably mounted on said leg portions of said frame, a housing member attached to one of said leg portions, a flexible diaphragm secured between said housing member and said one leg portion over an opening through the wall of said one leg portion to form a fluid tight chamber with said one leg portion, a coupling pipe connected to the interior of said frame to form a closed fluid system with said frame and for transmitting fluid into and out of said chamber to move said diaphragm between stretched and relaxed positions in response to variations of fluid pressure, power means for intermittently varying the fluid pressure within said closed fluid system, a piston member supported outside of said chamber in a position to be moved by said diaphragm in a reciprocating manner through said housing member between extended and retracted positions, and motor means connected between said piston member and said one wheel for rotating said one wheel in response to the movement of said piston member through a predetermined distance for each complete cycle of movement of said piston member through said extended and retracted positions.

18. Drive mechanism for moving an irrigation line, comprising:

a hollow support frame adapted to be attached to said irrigation line, a pair of wheels rotatably mounted on said support frame, a housing member secured to said frame adjacent one of said wheels, a flexible diaphragm attached to said housing member to form a fluid tight chamber, a passageway communicating with the interior of said chamber, coupling means connected to the interior of said frame to form a closed fluid system with said chamber and said frame for transmitting fluid through said passageway into said chamber to move said diaphragm between stretched and relaxed positions in response to variations of fluid pressure, a piston supported outside of said chamber in a position to be moved by said diaphragm between extended and retracted positions, and motor means connected between said piston and said one wheel for rotating said one wheel through a predetermined distance for each complete cycle of movement of said piston through said extended and retracted positions, said motor means including a dog member pivotally attached to said piston, a worm member rotatably mounted on said frame having a plurality of notches in one end thereof for engagement with said dog member to rotate said worm member in steps, a worm wheel fixedly attached to said one wheel in engagement with said worm member to form a worm gear for rotation of said one wheel, and a spring mounted to resiliently urge said dog member to a first position or a second position to enable reversing rotation of said worm member and said one wheel.

19. An irrigation apparatus as set forth in claim 1, wherein there are drive means by which the sprinkling pipeline means is driven and wherein there are drive means by which the wheel means is driven, and wherein the latter drive means includes telescopic conduit means.

20. An irrigation system as set forth in claim 7, in which the drive means for said conduit rig includes said telescopic sections and means for preventing rearward movement of said conduit rig whereby extension of said telescopic sections under water pressure drivingly extends it forwardly in the direction of movement of said pipeline means.

*21. An irrigation apparatus comprising:*

*sprinkling pipeline means supported for lateral movement across a plot of ground in transverse relation to its direction of travel, said pipeline means including water discharge means located therealong for sprinkling said ground as said pipeline means travels thereacross,*

*traveling water supply means connected to said pipeline means for traveling with said pipeline means and supplying water thereto as said pipeline means moves across said plot of ground,*

*a connecting means for connecting said traveling supply means to a stationary source of water,*

*said pipeline means and said traveling supply means being simultaneously driven in substantially the same direction so that said traveling means can maintain continuous connection with said pipeline means and continuously supply water to said pipeline means,*

*and control means operatively interconnected between said pipeline means and said traveling supply means and responsive to a differential of movement therebetween for regulating the driven speed of one of said means with respect to the other in a sense to reduce said differential so that the movement of the two will be substantially synchronized and alignment therebetween substantially maintained.*

*22. The apparatus according to claim 21 wherein said sprinkling pipeline means is supported for movement relative to the ground on a plurality of movable carriages spaced along said pipeline means and having rolling contact with the ground, said carriages being driven together to result in substantially simultaneous movement thereof.*

*23. The apparatus according to claim 21 wherein said pipeline means and said traveling supply means are driven by separate drive means, said control means being connected for sensing misalignment between said pipeline means and said traveling supply means and for adjusting the relative speed of said drive means to lessen such misalignment.*

*24. Irrigation apparatus comprising sprinkling pipeline means including a horizontal, essentially straight, pipeline having spaced upright sprinklers,*

*ground-engaging rolling means supporting said pipeline for movement across a plot of ground in the direction which is generally at right angles to the length of said sprinkling pipeline and with said sprinklers thereof in upright position during such movement,*

*mobile water conducting means arranged to move with said pipeline means,*

*conduit means for connecting said mobile means to a stationary source of water under pressure and supplying water from said source to said mobile means during travel of said mobile means and said sprinkling pipeline means relative to said stationing source,*

*drive means for causing movement of said mobile means and said sprinkling pipeline means in the same direction,*

*said drive means including a drive to said rolling means and a drive to said mobile means wherein the latter drive, if unrestrained, would cause said mobile means to move at a faster rate than said sprinkling pipeline means,*

*a control arrangement for said mobile means for restraining the same,*

*said control arrangement including swivel joint means interposed between said mobile means and sprinkling pipeline means and turnable upon changes in the relative positions of said mobile means and said sprinkler pipeline means,*

*and control means responsive to turning movement at said swivel joint means for controlling the positions of said mobile means and said sprinkling pipeline means relative to one another.*

*25. An irrigation apparatus comprising,*

*sprinkling pipeline means supported for movement across a plot of ground in transverse relation to its direction of travel,*

*mobile means for conducting water to said pipeline means and arranged to move with said pipeline means,*

*conduit means for connecting said mobile means to a source of water under pressure and supplying water from said source to said mobile means during travel of the latter,*

*drive means for causing movement of the mobile means and said pipeline means in the same direction and applying a moving force separately to each of such means,*

*swivel joint means connecting said mobile means to said pipeline means and turnable in response to a differential in movement between said mobile means and pipeline means, and*

*control means associated with said swivel joint means and responsive to turning movement thereof to effect a variation in the relative rates of movement of said mobile means and pipeline means in a manner to lessen said differential.*

*26. An irrigation apparatus comprising pipeline means including a horizontal, essentially straight, sprinkling pipeline supported by ground-engaging rolling means for movement across a plot of ground in a direction which is generally at right angles to the length of said pipeline,*

*said pipeline at one end having an extension which extends downwardly from said pipeline and then horizontally at right angles to said pipeline,*

*conduit means connected at one end to said extension and having means at its opposite end for connection to a stationary source of water under pressure for the supply of water from said source to said pipeline during travel of said sprinkling pipeline means relative to said source,*

*drive means for causing movement of said extension and said sprinkling pipeline means in the same direction and applying a moving force separately to said extension and sprinkling pipeline means,*

*means responsive to separating movement of said pipeline means and extension for varying the relative forces applied to said sprinkling pipeline means and said extension.*

*27. An irrigation apparatus as described in claim 26 wherein said drive means has a driving connection to said extension,*

*and swivel joint means in said extension downstream of said connection for permitting limited separation of said extension and sprinkling pipeline means.*

References Cited

The following references, cited by the Examiner, are of record in the patented file of this patent or the original patent.

UNITED STATES PATENTS

| | | | |
|---|---|---|---|
| 404,780 | 6/1889 | Dowd | 138—106 X |
| 709,376 | 9/1902 | Thomas | 137—344 X |
| 1,003,036 | 9/1911 | Crowe et al. | 74—126 X |
| 1,931,900 | 10/1933 | McQuaid | 74—126 X |
| 1,966,783 | 7/1934 | Balaam | 239—212 |
| 2,563,584 | 8/1951 | Crookston | 74—142 |
| 2,726,895 | 12/1955 | Behlen | 239—191 |
| 2,752,513 | 6/1956 | Boyd | 74—88 X |
| 2,841,119 | 7/1958 | Hard | 74—128 X |
| 2,896,858 | 7/1959 | Price | 239—212 |
| 2,940,672 | 6/1960 | Gaskell | 239—212 |
| 3,101,903 | 8/1963 | Hall | 239—187 |
| 3,246,848 | 4/1966 | Bowers | 239—212 |
| 3,281,080 | 10/1966 | Hogg | 239—212 |

M. HENSON WOOD, JR., *Primary Examiner.*

VAN C. WILKS, *Assistant Examiner.*